United States Patent [19]

Maldonado

[11] Patent Number: 5,515,611

[45] Date of Patent: May 14, 1996

[54] ROUTER GUIDE

[76] Inventor: Arturo Maldonado, 3700 Altura, El Paso, Tex. 79930

[21] Appl. No.: 345,777

[22] Filed: Nov. 22, 1994

[51] Int. Cl.⁶ .............................. B27C 5/10; B27B 9/04
[52] U.S. Cl. .................... 33/27.032; 33/27.03; 30/372; 144/371; 144/48.6
[58] Field of Search .................. 33/27.01, 27.02, 33/27.03, 27.031, 27.032, 27.04; 30/371, 372; 83/745; 144/371, 1 F, 134 D, 136 C

[56] References Cited

U.S. PATENT DOCUMENTS

| | | | |
|---|---|---|---|
| 2,943,392 | 7/1960 | Attridge | 33/27.01 |
| 3,635,268 | 1/1972 | Lange | 144/136 C |
| 3,858,630 | 1/1975 | Cherry et al. | |
| 4,324,514 | 4/1982 | Craven | |
| 4,685,496 | 8/1987 | Livick | 144/1 F |
| 4,798,506 | 1/1989 | Kulp, Jr. | |
| 5,016,354 | 5/1991 | Baine | 30/372 |
| 5,038,841 | 8/1991 | Larmon | 33/27.03 |
| 5,414,938 | 5/1995 | Meek | 33/500 |

FOREIGN PATENT DOCUMENTS

| | | | |
|---|---|---|---|
| 3917812 | 3/1991 | Germany | 144/134 D |
| 2202488 | 9/1988 | United Kingdom | 144/136 C |

Primary Examiner—Christopher W. Fulton
Attorney, Agent, or Firm—Richard C. Litman

[57] ABSTRACT

A guide for attaching to a router to form arcuate cuts in a workpiece. The router guide has a circular mounting plate which replaces a lower plate of a router. The guide has an elongated arm extending from the mounting plate with a slot extending along the longitudinal center line of the guide arm. An anchoring mechanism slidably carried in the slot includes an anchor fastener such as a wood screw or nail to anchor the anchoring mechanism to the workpiece and define a pivot point for the router and guide. The anchoring mechanism further includes a locking mechanism to releasably lock the anchoring mechanism in place along the slot to define the radius of travel of the router and guide about the pivot point.

12 Claims, 4 Drawing Sheets

ROUTER GUIDE

BACKGROUND OF THE INVENTION

1. Field of the Invention

The present invention relates to a device for forming precise circular and arcuate cuts in a workpiece with a router.

2. Description of the Prior Art

Carpenters, furniture manufacturers, and hobbyists alike commonly cut out large circular pieces of wood to make a multitude of products ranging from tabletops to barrel covers. By attaching a common router to a swing arm of known length which is then anchored to a pivot point on a workpiece, the router can be moved along a circular path shaping the workpiece to the desired radius.

The following patents illustrate router guides for forming arcuate cuts in a workpiece.

U.S. Pat. No. 3,858,630 issued to Cherry et al. on Jan. 7, 1975, discloses a router guide which uses opposing, variable length arms connected to a central suction/anchor to act as a pantograph to cut out a scaled reproduction of a template traced by one arm.

U.S. Pat. No. 4,324,514 issued to Craven on Apr. 13, 1982 discloses a suction anchored router guide for making straight or arcuate cuts in a piece of sheet metal.

U.S. Pat. No. 4,798,506 issued to Kulp, Jr. on Jan. 17, 1989, shows a router guide with a two-piece, telescopically adjustable arm which, when its length is fixed, defines the radius of travel for a router mounted on the router guide.

U.S. Pat. No. 5,038,841 issued to Larmon Aug. 31, 1991, discloses a router guide with a two-piece arm for guiding a router along an arcuate path of variable radius.

The shortcoming in the prior art devices is the complexity and number of parts inherent in their designs. The device of the present application eliminates the need for complex moving parts and telescoping arms while simultaneously reducing the cost and complexity of the guide. By making the guide base with a one piece construction, the stability and durability of the device can be increased while decreasing the complexity and costs.

None of the above inventions and patents, taken either singly or in combination, is seen to describe the instant invention as claimed.

SUMMARY OF THE INVENTION

The present invention provides an uncomplicated router guide with a one piece arm for guiding a router along a workpiece. The router guide has a fixed length, unitary guide arm with a central slot cut along the length of the guide arm. The guide arm terminates at one end in a mounting plate with a plurality of holes spaced apart to mate with the main body of a standard router in place of the existing lower plate of a router. An anchor-fastener slidably located within the guide arm slot can be selectively locked at a position along the slot to define a center of rotation for the router and guide.

By locking the anchor fastener at different locations along the slot, the router guide can be used to form various diameter cuts in the workpiece. To this end, the guide arm and an anchoring mechanism have cooperating indicators on the anchoring means to display both the radius and diameter of travel of the router guide.

Accordingly, it is a principal object of the invention to provide an enhanced router guide with a unitary guide arm of fixed length cooperating with an anchoring mechanism to guide a router along an arcuate path to shape a workpiece into a circle of predetermined radius.

It is another object of the invention to provide an enhanced router guide with an anchoring mechanism slidably received within a slot provided along the guide arm to allow the router to be move in arcuate paths of various, predetermined radii.

Still another object of the invention is to provide demarcations along the length of the guide which cooperate with indicators provided on the anchoring means to indicate with extreme accuracy the exact radius and diameter of travel of the router bit.

It is a further object of the invention to provide an enhanced router guide with a universal mounting plate at one end of the guide arm to receive a generic router within the mounting plate to easily and inexpensively attach the router guide in place of router's lower plate.

It is a further object of the invention to provide a sturdy router guide which can be made of metal, wood, or other material to provide a rugged, dependable tool which will withstand the abuse of manufacturing quantities or on-site construction demands without breaking or requiring extensive maintenance and upkeep.

It is also an object of the invention to provide improved elements and arrangements thereof in an apparatus for the purposes described which is inexpensive, dependable and fully effective in accomplishing its intended purposes.

It is still further an object of the invention to provide an improved locking or anchoring mechanism which is simple to operate and reliable.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
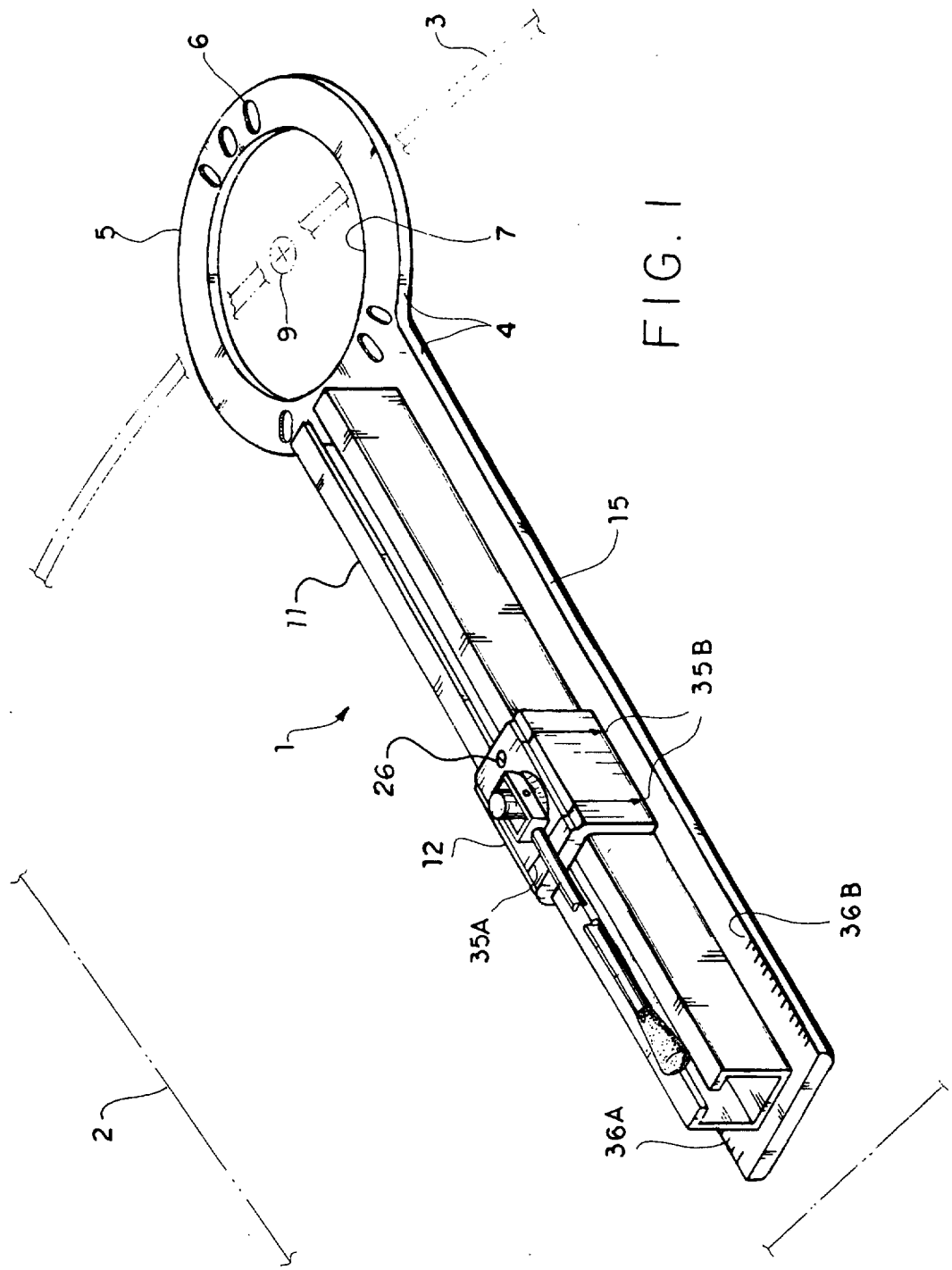
FIG. 1 is an environmental perspective view of the router guide.

Now referring to the drawings, a detailed description of the router guide embodying the present invention will be discussed. FIG. 1 shows a router guide 1 according to the present invention attached to a workpiece 2 and carrying a router (not shown) for forming an arcuate cut 3 in the workpiece. The router guide 1 has a one-piece guide base 4 with an elongated arm 15 terminating in a circular mounting plate 5, generally in the shape of a lower plate of a router.

The mounting plate 5 has a plurality of holes 6 to mate with the main body (not shown) of a router in place of the router's lower plate (not shown). The mounting plate has an inner radius 7 to accommodate a wide range of router drill bit sizes. Special drill bits (not shown) with an extended shaft must be used to cut all the way through the workpiece due to the guide's increased width over a normal lower plate.

Figure 2:
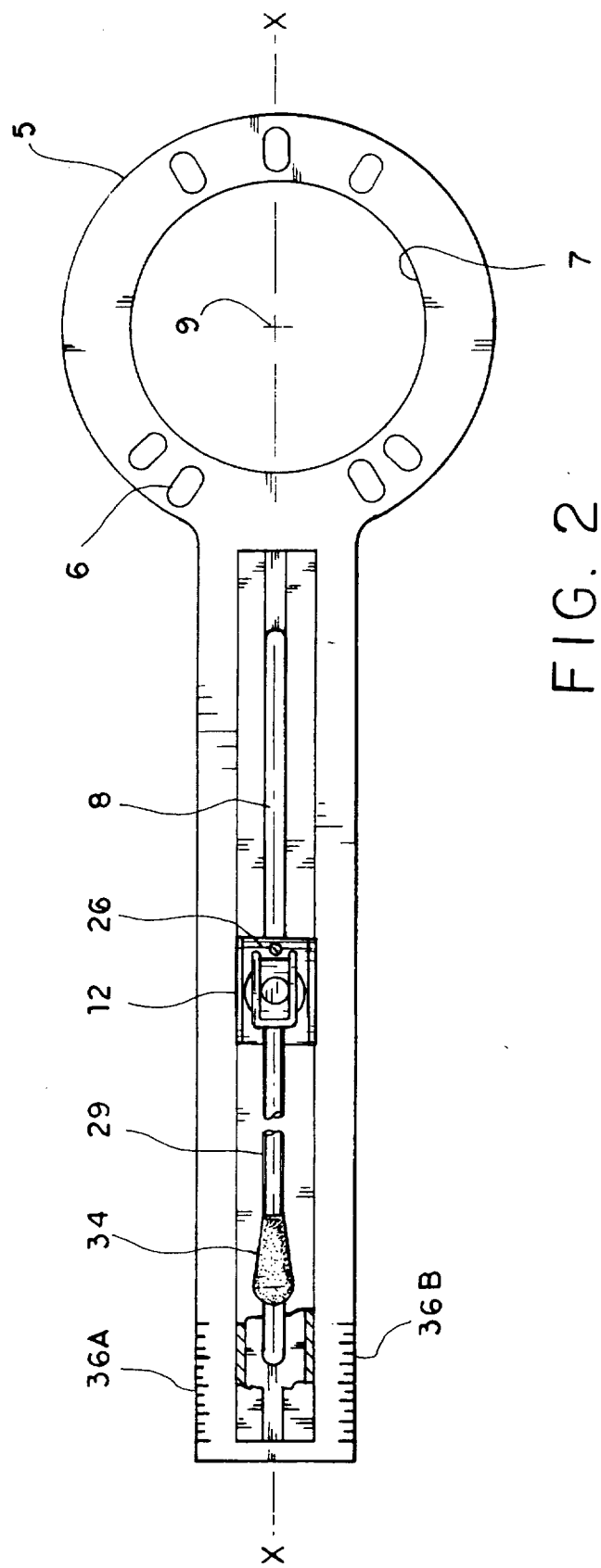
FIG. 2 is a top plan view of the router guide.
Figure 4:
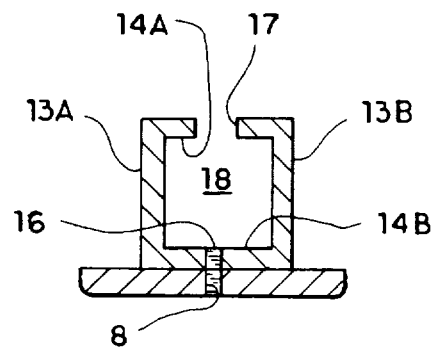
FIG. 4 is a cross-sectional view of the guide track and central opening.

With reference to FIG. 2, the guide arm 4 is generally rectangular with a central opening 8 extending along the longitudinal center line x—x of the guide arm 4 away from the mounting plate center, indicated at 9. A guide track carrying a anchoring/locking mechanism 12 is centered over the central opening 8 and extends at least the length of the central opening. As best seen in FIG. 4, the track 11 has a generally rectangular cross-section with two vertical sidewalls 13a and 13b and a top and bottom horizontal wall 14a and 14b defining a rectangular enclosure 18. The bottom wall 14b nearest the guide base is connected to the guide arm by a plurality of screws (not shown) along the length of the track. The bottom wall 14b has an opening 16 aligned with and generally the same shape as the guide base opening 8 to provide the anchoring mechanism 12 access to the workpiece 2 (see FIG. 1) beneath the router guide 1. The top wall 14a has an opening 17 to receive the anchoring means, and is aligned with the central opening 8 and extends the entire length of the track.

The anchoring/locking mechanism 12 is slidably located in the track enclosure 18 and central opening 8. As best shown in FIGS. 3–6, the anchoring/locking mechanism 12 is made up of a generally U-shaped housing 19 and a collar 22. The U-shaped housing includes a top wall 21 parallel to and exterior to the top wall 14a of the guide track, and two side walls 20a and 20b which are parallel to and exterior to the vertical guide track walls 13a and 13b.

The interior dimensions of the housing walls are slightly greater than the exterior dimension of the track walls to centrally locate the anchoring/locking mechanism 12 over the guide track 11 and to prevent the housing 19 from rotating relative to the track 11. The top wall 21 of the anchoring mechanism has two holes 41a, 41b which are aligned with the central opening. One hole is provided on either side of the collar. The apertures 41a, 41b are aligned with the openings 17 and 16 in the top and bottom walls such that an anchor fastener such as a wood screw or nail 26 inserted through an opening 41a, 41b in the anchoring mechanism housing 12 can be driven downwardly through the top and bottom openings 17 and 16 of the track, through a selected aperture 41a, 41b in the eccentric 30, and through the central opening 8 into the workpiece 2 to anchor the anchoring/locking mechanism 12 to the workpiece 2. The attachment mechanism 12 defines a pivot point or center of rotation for the router (not shown) and router guide 1 on the workpiece 2. The hole 41a nearer to the router allows the anchoring housing to be slid further back from the router before the fastener 26 reaches the end of the central opening and is used for larger radius cuts. The aperture 41b further away from the router mounting plate is used for shorter radius cuts.

The bottom edges of the side walls 20a and 20b of the anchoring mechanism housing are provided with indicators 35a and 35b which extend along the top and side walls of the anchoring mechanism with demarcations provided along the length of the guide arm. Two sets of demarcations 36a and 36b are provided on the guide arm. The first set 36a cooperates with the tab 35a to show the radius of travel of the router guide and the second set 36b cooperates with indicator 35b to show the diameter of travel. Each aperture 41a, 41b in the top wall 21 is provided with an indicator line which indicates the radius and diameter of travel of the router relative to the center 9 in use.

Figure 3:
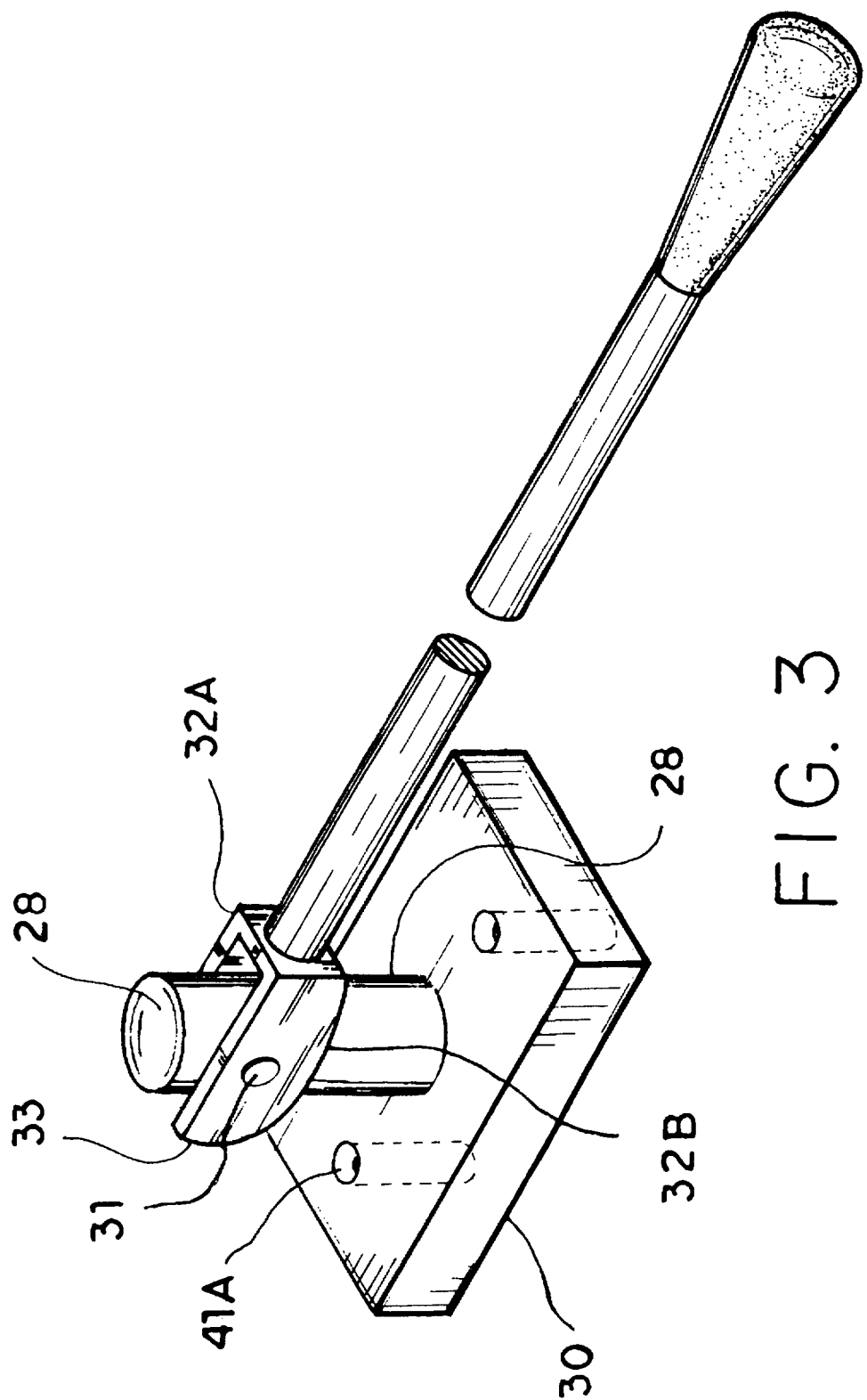
FIG. 3 is a perspective view of the locking mechanism of the router guide.

Referring now to FIG. 3, the locking mechanism 27 has a shaft 28 which is rotatably received inside the collar 22 of the anchoring/locking housing 12. The shaft 28 has a control lever 29 attached at its first end and an elongated, eccentric or lock 30 attached to a second end. The shaft 28 can be attached to the control lever 29 by a rivet, pin, or suitable fastener 31 which will allow the control lever 29 to rotate relative to the shaft 28. The shaft has a keyed cross section (not shown) at its second end which mates with a corresponding receiving hole (not shown) in the eccentric to securely receive the eccentric. The shape of the key cross-section can be rectangular, elliptical, or other such shape which will prevent the eccentric from rotating relative to the shaft. In a preferred embodiment, however, the receiving hole has the same shape as the eccentric.

The control lever 29 includes two parallel vertical plates 32a and 32b which are riveted through the center of the plates to the shaft 28 and to each other. The two plates 32a and 32b have cam shaped contours 33 at one end of their bottom edge. A handle 34 connected to the plates 32a and 32b on an edge opposite the cam shaped edge provides external access to the locking mechanism 27 to allow manipulation of the shaft 28 and the eccentric 30. In the preferred embodiment, the longitudinal axes of the eccentric and the handle 34 are substantially parallel.

Figure 5:
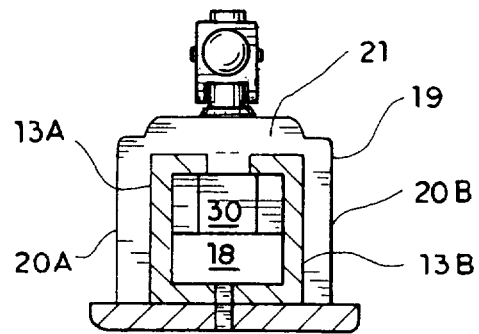
FIG. 5 is a cross-sectional view of the anchoring/locking mechanism and guide track with the eccentric shown in the locked position.
Figure 6:
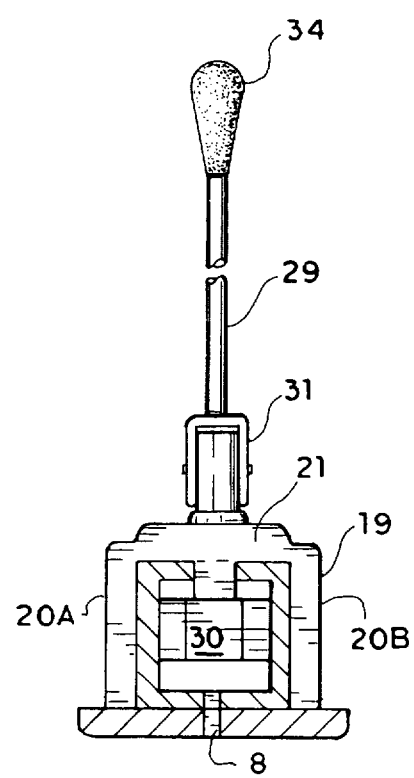
FIG. 6 is a cross-sectional view of the anchoring/locking mechanism and guide track in the retracted position.

The operation of the locking mechanism 27 is best shown with regard to FIGS. 4–6. FIG. 4 shows the track mechanism in cross section without the anchoring mechanism installed. FIG. 5 depicts the anchoring/locking mechanism 12 in the locked position where the handle of the control lever 29 is parallel with the guide 1 and the eccentric 30 (see FIGS. 3 and 5) is in a locked position, pressing against the top wall 14 of the track to hold the anchoring mechanism in place. Lifting the handle 34 to a position as shown in FIG. 6 will release the pressure of the cam 33 on the collar 22, which in turn releases pressure of the eccentric on the top wall of the track. When the control lever 29 and eccentric are in this retracted position, the locking mechanism 17 is in the retracted position and can be freely slid up or down the track to vary the radius of travel for the router about the pivot point.

Thus, when a carpenter or other user desires to cut a circular piece of wood out of a workpiece, the user removes the screws (not shown) which hold a lower plate (not shown) onto the main body of a router (not shown). The router (not shown) can then be installed on the mounting plate 5 of the router guide 1 by re-threading the screws (not shown) back through the mounting plate 5 and into the router body (not shown). The user then lifts the control handle 29 of the locking mechanism 27 to the released position and slides the locking mechanism 12 along the track 11 until the indicators 35a and 35b point to the desired radius or diameter for the cut 3. The control handle must then be returned to a position parallel with the guideline center line x—x to move the eccentric 30 to lock against the top wall 14 of the track.

With the locking mechanism 27 secured, the user then installs a nail, wood screw, or other well known anchor fastener Z6 through a selected aperture 41a, 41b, down through the track housing opening 37 and aligned central opening 8 in the router base 4 and into the workpiece 2 at the center 9 of the desired cut. Using an elongated drill bit (not shown), typically a one-quarter inch bit, the router is then operated and moved along the arcuate path 3 defined by the router guide 1, creating a perfectly circular cut in the workpiece 2.

Because the router guide base 4 is made entirely of one unitary piece, the strength and durability of the device is greatly improved over a router guide with multiple telescoping arms. There are many inherent drawbacks to using telescoping arms, especially the necessity to keep exact tolerances between the parts to ensure that each arm slides freely against the other. The present device avoids such difficulty by providing only a one piece arm, with the cutting radius adjusted by moving only the locking mechanism instead of heavier, lengthier telescoping pieces. The use of demarcations along the router guide arm, which indicate both radius and diameter, allows the user to quickly and simply locate the guide in the desired position. The scales are corrected for the distance of the router bit to the mounting plate, and for the location of the pivot point with respect to the eccentric and to the scales, reducing the off-set calculations necessary by the user. While in the preferred embodiment a one-quarter inch drill bit has been used in the calculations, the scales could also be marked relative to the center position of the drill, or for another such standard.

And further, it is to be understood that the present invention is not limited to the sole embodiment described above, but encompasses any and all embodiments within the scope of the following claims.

I claim:

1. A router guide for guiding a router along a predetermined arcuate path, comprising:

a guide base having a guide arm;

a mounting plate, said guide arm terminating in said mounting plate;

said guide arm including means defining an elongated central opening;

said mounting plate including a plurality of holes to receive a router;

an anchoring mechanism slidably located within said central opening and including an anchor fastener and a locking mechanism;

said anchoring mechanism including a main housing having U shaped walls defining an enclosure and a locking mechanism extending into said enclosure;

a guide track centered above said central opening and extending at least the length of said central opening;

said guide track further including top and bottom horizontal walls and two vertical side walls to define a track enclosure;

said top and bottom walls having means defining openings aligned with said central opening;

said guide track being dimensioned to fit slidably within said enclosure of said anchoring mechanism housing, and said locking mechanism extending through said top wall opening into said track enclosure to selectively secure said anchoring and locking mechanism in place over said guide track; whereby said anchor fastener secures said anchoring mechanism to a workpiece, and said locking mechanism secures the anchoring mechanism to the router guide to define a center of rotation and radius of travel for the router about the workpiece.

2. The router guide according to claim 1, wherein said mounting plate is generally circular and includes an inner radius to accommodate the drill bit of a router.

3. The router guide of claim 1, wherein said guide arm further includes a top surface having graduated demarcations parallel to said central opening along either side of the top surface to indicate the radius and diameter of travel of the router about said center of rotation.

4. The router guide according to claim 1, wherein said anchoring housing further includes at least one means defining an aperture in said top wall of said anchoring housing to receive said anchor fastener.

5. The router guide according to claim 4, wherein said anchor fastener extends through said aperture in top wall of said anchoring housing through said openings in said top and bottom track wall, and through said opening in said central opening and attaches to said work piece.

6. A router guide for guiding a router along a predetermined arcuate path, comprising:

a guide base having a guide arm;

a mounting plate, said guide arm terminating in said mounting plate;

said guide arm including means defining an elongated central opening;

said mounting plate including a plurality of holes to receive a router;

an anchoring mechanism slidably located within said central opening and including an anchor fastener and a locking mechanism;

a guide track centered above the central opening and extending at least the length of the central opening;

said guide track further including top and bottom horizontal walls having means defining openings aligned with said central opening, and two vertical side walls to define a track enclosure;

said anchoring mechanism including a main housing having a top wall and two side walls forming a U shape housing;

a collar formed in said top wall defining a circular opening centered in said top wall;

a locking mechanism rotatably received within said circular opening of said collar, and including a central shaft, a control lever, and an eccentric;

said control lever extending outward from a first end of the central shaft beyond the anchoring mechanism housing; and said eccentric being attached to a second end of the central shaft within the anchoring mechanism housing; whereby said anchoring mechanism housing slidably engages said track means such that said central shaft and eccentric rotatably extend into said track enclosure to selectively secure said anchoring and locking mechanism in place over said guide track; and said locking mechanism cooperating with said guide arm to selectively lock said anchoring mechanism at various locations along the central opening; whereby said anchor fastener secures said anchoring mechanism to a workpiece, and said locking mechanism secures the anchoring mechanism to the router guide to define a center of rotation and radius of travel for the router about the workpiece.

7. The router guide according to claim 6, wherein said anchoring housing further includes at least one means defining an aperture in said top wall of said anchoring housing to receive said anchor fastener.

8. The router guide according to claim 7, wherein said anchor fastener extends through said aperture in said top wall of said anchoring housing through said openings in said top and bottom track wall, and through said opening in said central opening and attaches to said work piece.

9. The router guide of claim 6, further comprising:

a handle means connected to said control lever of said locking mechanism;

said control lever further comprising two vertical plates attached to said central shaft;

each of said two vertical plates having a cam shaped face at an edge opposite said handle means; and said handle means is moveable between a first position substantially parallel to said guide arm and a second position elevated relative to said guide arm;

whereby when said handle means is moved from said second position to said first position, said cam shaped face engages said collar and raises said shaft and said eccentric, causing said eccentric to non-slidably engage said top wall of said anchoring mechanism housing.

10. The router guide of claim 9, wherein said guide arm further includes a top surface having graduated demarcations parallel to the central opening along either side of the top surface to indicate the radius and diameter of travel of the router about the center of rotation.

11. The router guide of claim 6, further comprising:

a handle connected to said control lever of said locking mechanism;

said control lever further comprising two vertical plates riveted to said central shaft;

each of said two vertical plates having a cam shaped face at an edge opposite said handle; and said handle means moveable between a first position substantially parallel to said guide arm and a second position elevated relative to said guide arm;

whereby when said handle means is moved from said second position to said first position, said cam shaped face engages said collar and raises said shaft and said eccentric, causing said eccentric to non-slidably engage said top wall of said anchoring mechanism housing.

12. A router guide for guiding a router along a predetermined arcuate path, comprising:

a guide base having a guide arm terminating in a circular mounting plate, wherein said mounting plate includes an inner radius to accommodate a drill bit of said router;

said guide arm including means defining an elongated central opening;

said mounting plate including means defining a plurality of holes to receive a router;

an anchoring mechanism slidably located within said central opening and including an anchor fastener and a locking mechanism, said locking mechanism cooperating with said guide arm to selectively lock said anchoring mechanism at various locations along the central opening;

a guide track centered above the central opening and extending at least the length of the central opening;

said guide track further including top and bottom horizontal walls having means defining openings aligned with said central opening, and two vertical side walls to define a track enclosure;

said anchoring mechanism including a main housing having a top wall and two side walls forming a U shape housing;

a collar formed in said top wall defining a circular opening in said top wall;

a locking mechanism rotatably received within said circular opening of said collar including a central shaft, a control lever, and an eccentric;

said control lever extending outward from a first end of the central shaft beyond the anchoring mechanism housing, and said eccentric attached to a second end of the central shaft within the anchoring mechanism housing;

said anchoring housing further includes at least one means defining an aperture in said top wall of said anchoring housing to receive said anchor fastener, and wherein said anchor fastener extends through said aperture in said top wall of said anchoring housing through said openings in said top and bottom track wall, and through said opening in said central opening; and said guide arm further includes a top surface having graduated demarcations parallel to the central opening along either side of the top surface to indicate the radius and diameter of travel of the router about the center of rotation; whereby said anchor fastener secures said anchoring mechanism to a workpiece, and said locking mechanism secures the anchoring mechanism to the router guide to define a center of rotation and radius of travel for the router about the workpiece.

* * * * *